Patented Aug. 11, 1953

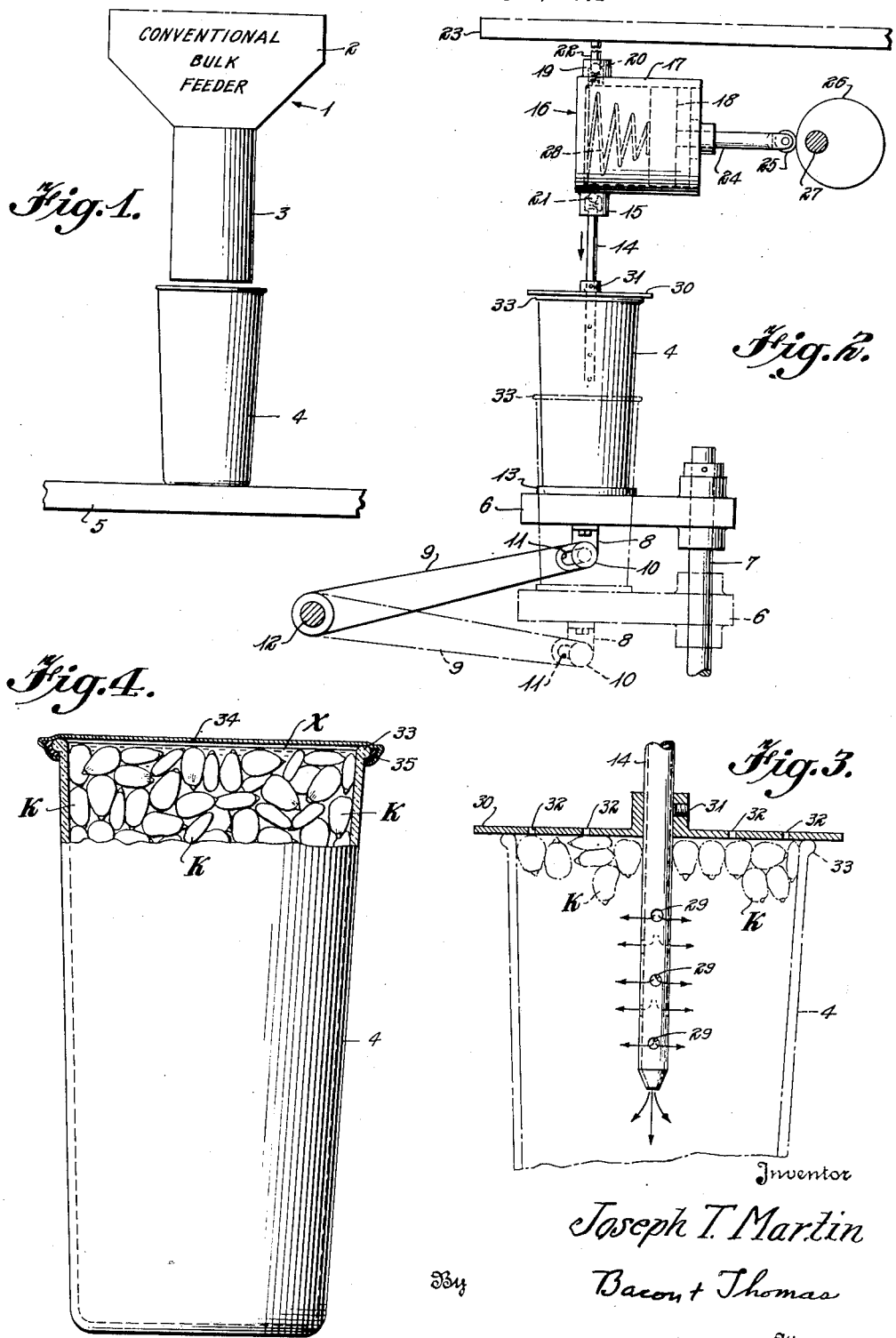

2,648,479

UNITED STATES PATENT OFFICE 2,648,479

APPARATUS FOR PACKAGING POPCORN

Joseph T. Martin, Thomasville, Ga., assignor, by mesne assignments, to Rose Kist Foods, Inc., a corporation of Georgia Original application May 8, 1951, Serial No. 225,201. Divided and this application May 19, 1953, Serial No. 356,434

3 Claims. (Cl. 226—107)

The present invention relates to apparatus for use in packaging popcorn kernels.

This application is a division of my application, Serial No. 225,201, filed May 8, 1951.

More particularly, the invention relates to the packaging of popcorn kernels in such form that they are ready to be "poured" into a corn popper, without requiring the user to do any measuring of either kernels or oil, as is now the customary practice. In other words, the packaged product contains the proper amount of popcorn kernels and popping oil for best popping results.

The principal object of the invention is to provide a package containing popcorn kernels and popping oil in a "ready-to-pop" condition.

Another object of the invention is to provide an apparatus of packaging popcorn kernels in such a way as to retain the proper moisture content in the kernels and at the same time utilize the moisture-retaining medium to effect popping of the kernels to maximum size or volume.

Another object of the invention is to provide packaged raw popcorn which will have a long shelf life.

Another object of the invention is to provide an edible blend of vegetable oils which will prevent the escape of moisture from the popcorn kernels, but which will not penetrate the hull of the kernels and permeate the interior of the kernels.

Still another object of the invention is to provide an apparatus for packaging popcorn kernels wherein the kernels are coated with and immersed in the proper amount of oil for effecting maximum popping volume of the kernels.

Still another object of the invention is to provide suitable apparatus for adding a predetermined amount of popping oil to a predetermined amount of popcorn kernels in a container.

A further object of the invention is to provide packaged popcorn kernels in which the kernels are of predetermined size so that the voids between the kernels when filled with oil will suffice as a measure of the proper amount of oil necessary for optimum popping of the popcorn.

A further object of the invention is to provide ready-to-pop packaged popcorn kernels characterized by the feature that the popcorn and popping oil can be simultaneously poured from the container, as a somewhat cohesive but flowable mass, into a popper to be popped, without the addition of any other ingredients.

A still further object of the invention is to provide a package of treated popcorn kernels from which any desired portion can be removed and used, without requiring resealing of the container, and without danger of undue deterioration of the remainder of the popcorn kernels.

A still further object of the invention is to provide an edible popping oil and method of preparing the same which will provide for maximum popping volume and good taste and at the same time have a long shelf life without becoming rancid.

Other objects and features of the invention will become apparent from the following description taken in conjunction with the accompanying drawings in which:

Fig. 1 is a diagrammatic view illustrating a glass container positioned to receive a predetermined weight or volume of popcorn kernels from a conventional weigher or bulk feeder;

Fig. 2 is a diagrammatic view illustrating the container after having been filled with popcorn kernels and in position to have the popping oil injected thereinto;

Fig. 3 is an enlarged detail view partly in cross-section and particularly illustrating a retainer plate for preventing the popcorn kernels from being displaced from the container while the popping oil is being forced thereinto; and Fig. 4 is a view partly in cross-section of the filled container after capping and sealing.

In practicing the principles of the present invention, the popcorn is shelled and cleaned by conventional means to remove dirt and other foreign matter therefrom, and is then passed over a series of screens of predetermined mesh size in order to select the kernel size best suited for packaging for the general consumer market. As one operative example of the invention, popcorn kernels are selected which will pass through a #20 conventional screen having an opening size of $20/64$ of an inch, but which will remain upon a #13 conventional screen having an opening size of $13/64$ of an inch. The selected popcorn kernels are also passed over conventional gravity separator screens which serve to separate the defective kernels, even though of proper size but of improper weight, from the sound kernels, so that only acceptable kernels are retained for packaging purposes. The selected popcorn kernels may be dried, if necessary, or humidified, until they have a desired moisture content of 13.5% to 14.5%, and preferably 14%.

The popcorn kernels may be packaged in containers of any suitable size, but for household or domestic use, it is preferable to package the kernels in a 12-ounce overflow glass that can be reused by the purchaser as a beverage glass.

About 10 ounces by weight of kernels of a selected size will substantially fill the 12-ounce glass. About 3½ ounces of popping oil, described in detail hereinafter, is introduced into the glass containing the popcorn kernels by an apparatus which will also be described in detail later. It has been found experimentally that 3½ ounces of oil not only constitutes the correct amount for popping the 10 ounces of popcorn kernels, but that such amount of oil when introduced into a 12-ounce glass will substantially fill the voids between the popcorn kernels and provide a level such that all of the kernels are immersed in the oil, and without having an excess layer of oil above the kernels. Thus, the preferred ratio of popcorn kernels to popping oil by weight is 10 to 3½ or approximately 3 to 1. It is possible to package 10 ounces of popcorn kernels of a preselected size with 2¾ to 4 ounces of the popping oil in a suitable container and obtain fairly good results, although in order to obtain the best results and maximum popping volume and proper taste, it is preferred to mix only 3½ ounces of oil with 10 ounces of popcorn kernels. An excessive amount of oil will give the popcorn an undesirable oily taste and preclude its satisfactory use in making candied popcorn, and too little oil will reduce the popping volume of the kernels.

The popping oil preferably used in packaging the popcorn kernels consists of a special blend of edible vegetable oils, comprising, by weight, 40% refined soy bean oil which has been hydrogenated and which has a melting point of about 78° F. to 80° F., 60% refined peanut oil, and a sufficient amount of any suitable preservative to prevent rancidity. These two oils are preferably separately preheated, by steam or other suitable means, to a temperature of 160° F. to 190° F. and preferably to 180° F. and then introduced into a steam jacketed kettle (not shown) and mixed together by mechanical agitation while in the kettle and while maintained at a temperature of between 160° F. and 190° F. and preferably 180° F. The preservative is added to the kettle for uniform dispersion in the oils. The agitation is continued long enough to thoroughly mix or blend the oils and the period of agitation will vary, of course, with the volume of oils being mixed, the size of the kettle and the type of mechanical agitator used. In any event, the time required for proper blending can be readily ascertained from working conditions and will present no problem to anyone familiar with the art.

Artificial butter flavoring and artificial coloring may be added, if desired, during the blending of the oils in the steam kettle. The butter flavoring may be added in the proportion of 12 cc. per 100 pounds of blended oil, and artificial yellow, vegetable coloring may be added in the proportion of ¼ ounce of coloring per 100 pounds of the blended oil, more or less, depending upon the strength of color desired. Any suitable preservative can be mixed with the oils to extend the shelf life of the product and prevent rancidity and, as an example, benzoate of soda in the amount of $\frac{1}{16}$ of 1% by weight may be added to the oil.

The proportion of 40 pounds of hydrogenated soy bean oil and 60 pounds of refined peanut oil is the preferred proportion, but fairly satisfactory results can be obtained with 30% to 50% (30-50 pounds) hydrogenated soy bean oil and 50% to 70% (50-70 pounds) refined peanut oil. Irrespective of the proportions of soy bean oil and peanut oil used within the ranges stated, the flavoring matter, coloring, and preservative may be added in the same proportion per 100 pounds of the mixed or blended oils. No salt is added to the blended oils in order to avoid reaction with the oils and to avoid possible development of rancidity.

The blended oils and preservative, either with or without added flavoring and coloring matter, are taken from the steam kettle and introduced directly into an homogenizer. The action of the agitator in the steam kettle thoroughly mixes together the two oils and preservative (and the color and flavoring, if added) and the homogenizing prevents subsequent separation or agglomeration of the hydrogenated soy bean oil and eliminates the necessity of using an emulsifying agent. If the homogenized oil is to be used directly in the packaging process then it is cooled to a temperature of about 120° F. by passing the same through a conventional heat exchanger. If the homogenized oil is not to be used immediately, then it can be stored in a suitable container. The homogenized oil can be sold in bulk to other processers, but if it is to be used for popcorn kernel packaging purposes, then it should be reheated to a temperature of about 120° F. to assure rapid flow into the voids between the popcorn kernels, as will appear more fully hereinafter. This temperature is also such as to enable the filled containers to be comfortably handled by the operator without fear of burning the hands and at the same time it is also low enough to avoid breakage of the glass containers, as a result of undue temperature changes, and the consequent waste of popcorn kernels and oil.

The popping oil is somewhat viscous even at room temperatures and adheres to the popcorn kernels in completely surrounding relation thereto, so that upon opening the container for use, the popcorn kernels and the adhering popping oil can be simultaneously poured as a flowable mass into a suitable pan or popper. The unused portion can be kept in the container for a long period of time without airtight resealing, and without danger of rancidity developing.

It is to be understood that while the homogenized blended oils have been described as a popcorn popping oil, the oil is not limited to such use but is adapted for other uses such as preparing potato chips, French fried potatoes, etc.

Referring now to Fig. 1, a conventional weigher or bulk feeding apparatus is generally identified by the reference numeral 1 and comprises a hopper 2 provided with a discharge spout 3. The bulk feeder 1 is adapted to discharge a predetermined weight or volume of popcorn kernels at room temperature into a container, such as a 12-ounce glass 4, which is suitable for popcorn packaging purposes intended for household consumer sales. The container 4 is supported by a platform 5 disposed below the discharge spout 3. The bulk feeder 1 discharges a predetermined volume of popcorn kernels K sufficient to substantially completely fill the container 4. It has been determined experimentally that approximately 10 ounces of popcorn kernels of the size specified and with the desired moisture content will substantially completely fill the container 4.

While a container 4 in the form of a 12-ounce glass has been referred to as suitable for packaging purposes, the same is mentioned by way of illustration and not limitation, and it is to be distantly understood that the principles of the present invention are equally applicable to all types and sizes of containers.

The container 4 with the popcorn kernels therein is then manually or otherwise positioned upon a platform 6 slidably mounted upon a vertical rod 7, said platform being adapted to be raised and lowered by any suitable mechanism. For illustrative purposes, a bracket 8 is shown fastened to the underside of the platform 6, and one end of a lever 9 is shown connected to the bracket 8 by a pivot pin 10 riding in an elongated slot 11 formed in one end of the lever 9. The other end of the lever 9 is fixed to a shaft 12 adapted to be oscillated by any suitable means (not shown). The platform 6 carries an indexing ring 13 for properly indexing the container 4 with respect to a tube 14 having its upper end connected with the discharge outlet 15 of any suitable or conventional pump 16.

The pump 16 comprises a cylinder 17, a piston 18 reciprocable in said cylinder, an inlet 19 having a spring-pressed inlet check valve 20 mounted therein, and a spring-pressed outlet check valve 21 mounted in the discharge outlet 15. The pump inlet 19 is connected by a pipe 22 with a tank 23 containing a supply of the preferred edible popping oil, described in detail hereinbefore. A piston rod 24 is connected at one end to the piston 18 and carries a roller 25 at its opposite end. A cam or eccentric 26 mounted upon a shaft 27 is engaged with the roller 25 for effecting positive movement of the piston 18 in the cylinder 17 during the work stroke to force a predetermined volume of popping oil out of the cylinder 17, through the tube 14, and into the container 4. A spring 28 is disposed in the cylinder 17 and engaged with the piston 18 for effecting movement of the piston in the opposite direction, as permitted by the cam 26. It is to be understood that the pump and operating mechanism therefore may be of any suitable construction, so long as it is adapted to pump a predetermined volume of oil into the container 4 on each work stroke of the piston 18.

The diameter of the cylinder 17 and the stroke of the piston 18 are proportioned, according to one operative example of the invention, so that upon each intake stroke of the piston 18 a predetermined volume of the popping oil at a temperature of about 120° F., and equal to 3½ ounces by weight, is drawn into the cylinder 17 through the inlet check valve 20, whereby, upon the work stroke of the piston 18, the oil is forced out of the cylinder 17 and into the tube 14 for rapid injection under pressure into the kernel-filled container 4.

The tube 14 is open at its lower end and provided with a plurality of openings 29 extending through the sidewall thereof in a region below a retainer plate 30 fixed by a set screw 31 to said tube at a predetermined distance from the discharge end of said tube. The plate 30 has a plurality of openings 32 extending therethrough which overlie the container 4 and permit air to escape from the container 4 as it is displaced by the popping oil being forced into said container while at the same time preventing the popcorn kernels K from being pushed out of the container by the pressure of the injected oil. The openings 32 are too small to permit the passage of the popcorn kernels K therethrough and the plate 30 thus makes it possible to quickly inject the oil into the container 4 and thereby greatly speed up the packaging process. The popping is, as before stated, preferably maintained at a temperature of about 120° F. in the tank 23 to increase its viscosity so that it will flow freely through the tube 14 and into the voids in the container 4 between the kernels K.

It will be understood that the pump 16 is actuated in predetermined timed relation with the lever 9 so that the platform 6 is raised from its position shown in dot-and-dash lines in Fig. 2 to its full line position, whereby the tube 14 enters the container 4 to a substantial depth and the container assumes a position with its open end adjacent the retainer plate 30, before the popping oil is injected into said container. The elevating movement of the platform 6 is such that the upper beaded edge 33 of the container 4 is preferably brought into engagement with the retainer plate 30, as clearly shown in Fig. 3. After the popping oil has been introduced into the container 4, the platform 6 is lowered to its initial position and the filled container 4 is removed manually or otherwise and replaced by another container filled with popcorn kernels and to which the popping oil is to be added by a repetition of the cycle just explained.

It is to be understood that the popping oil added to the container fills all of the voids between the kernels K and assumes the level X, indicated in Fig. 4, so that all of the kernels are immersed in and completely covered with the oil. The kernels K are heavier per unit volume than the oil and, therefore, do not float in the oil. After the oil has been added to the container, a conventional metallic cover 34 having a rubber gasket 35 therein is applied to the open end of the container to form an air-tight seal with the bead 33.

The consistency of the popping oil is such that, as before stated, when it is desired to use the product, one need only "pour" the kernels out of the container into the popper and the appropriate amount of oil will accompany the kernels. Thus, the package provided by the present invention contains popcorn kernels in a condition ready-to-be-popped. Moreover, the kernels are coated with oil at all times to preserve their moisture content and the optimum amount of oil is always present to insure maximum popping volume.

It will be understood that the disclosure is not limited to packaging a specific size of popcorn kernel with a predetermined amount of oil, inasmuch as various sizes of kernels can be packed with the requisite amount of popping oil, as desired.

It will also be understood that the proportions of the popcorn and popping oil, and the proportions and method of mixing and blending the oils may be varied slightly from the limits set forth herein without departing from the principles of the invention, and that fats or oils other than the oils specifically named may be substituted in carrying out the packaging process. It will also be understood that any suitable apparatus may be employed for effecting the introduction of the popcorn kernels into the container, and that changes in the details of construction and in the arrangement of the apparatus disclosed herein for effecting the subsequent addition of the popping oil to the container may be made without departing from the principles of the invention or the scope of the annexed claims.

I claim:

1. Popcorn packaging apparatus, comprising: a support for an open top container substantially filled with a mass of popcorn kernels; a filling tube above said support for introducing popping oil into such container; means for moving said support and said filling tube relatively to each other to provide such a space between the lower end of said filling tube and support as will effect immersion of said lower end of said filling tube to a substantial depth into the popcorn kernels in such container, said filling tube having discharge port means positioned to normally be disposed substantially below the level of the popcorn kernels in such container to facilitate the introduction of popping oil into the voids between the popcorn kernels; a substantially flat retainer plate mounted on said filling tube and located at a point spaced a substantial distance above the lower end of said filling tube, the lower face of said plate being engageable with the container edge at the open top thereof and having vent openings to allow air to freely escape from the container through said vent openings while preventing the popcorn kernels from being forced out of the container at a time when popping oil is being introduced through said filling tube into the voids between the kernels; and means for forcing a sufficient volume of popping oil into such container through said filling tube to fill the voids between the popcorn kernels.

2. Popcorn packaging apparatus, comprising: a support for an open top container substantially filled with a mass of popcorn kernels; a filling tube above said support for introducing popping oil into such container; means for moving said support and said filling tube relatively to each other to provide such a space between the lower end of said filling tube and support as will effect immersion of said lower end of said filling tube to a substantial depth into the popcorn kernels in such container, said filling tube having discharge port means positioned to normally be disposed substantially below the level of the popcorn kernels in such container to facilitate the introduction of popping oil into the voids between the popcorn kernels; a substantially flat retainer plate mounted on said filling tube and located at a point spaced a substantial distance above the lower end of said filling tube, the lower face of said plate being engageable with the container edge at the open top thereof and having vent openings to allow air to freely escape from said container through said vent openings while preventing the popcorn kernels from being forced out of the container at a time when popping oil is being introduced through said filling tube into the voids between the kernels; and a pump for forcing popping oil into such container through said filling tube, said pump having means for providing a predetermined volumetric displacement of popping oil for each work stroke thereof sufficient to substantially completely fill all of the voids between the popcorn kernels in said container with a predetermined volume of popping oil.

3. Popcorn packaging apparatus, comprising: a support for an open top container substantially filled with a mass of popcorn kernels; a filling tube above said support for introducing popping oil into such container; means for moving said support and said filling tube relatively to each other to provide such a space between the lower end of said filling tube and support as will effect immersion of said lower end of said filling tube to a substantial depth into the popcorn kernels in such container; a substantially flat retainer plate; means adjustably mounting said plate on said filling tube to accommodate containers of different height, said plate normally being located at a point spaced a substantial distance above the lower end of said filling tube, said filling tube having discharge ports spaced along the length thereof below said plate and positioned to normally be disposed substantially below the level of the popcorn kernels in such container to provide for the simultaneous, rapid, introduction of popping oil at different levels into the voids between the popcorn kernels, the lower face of said plate being engageable with the container edge at the open top thereof and having vent openings to allow air to freely escape from the container through said vent openings while preventing the popcorn kernels from being forced out of the container at a time when popping oil is being introduced through said filling tube into the voids between the kernels; and means for introducing a sufficient volume of popping oil into such container through said filling tube to fill the voids between the popcorn kernels.

JOSEPH T. MARTIN.

No references cited.